(12) United States Patent
Noam et al.

(10) Patent No.: US 10,389,411 B2
(45) Date of Patent: Aug. 20, 2019

(54) HIERARCHIC BEAM-FORMING IN A CLOUD RADIO ACCESS NETWORK

(71) Applicant: Bar-Ilan University, Ramat Gan (IL)

(72) Inventors: Yair Noam, Mevaseret Zion (IL); Niv Menachem Arad, Givaat-Shmuel (IL)

(73) Assignee: Bar-Ilan University, Ramat Gan (IL)

( * ) Notice: Subject to any disclaimer, the term of this patent is extended or adjusted under 35 U.S.C. 154(b) by 0 days.

(21) Appl. No.: 16/133,810

(22) Filed: Sep. 18, 2018

(65) Prior Publication Data

US 2019/0097689 A1  Mar. 28, 2019

Related U.S. Application Data

(60) Provisional application No. 62/559,894, filed on Sep. 18, 2017.

(51) Int. Cl.
*H04B 7/06* (2006.01)
*H04B 7/024* (2017.01)
*H04B 7/0456* (2017.01)

(52) U.S. Cl.
CPC ........... *H04B 7/024* (2013.01); *H04B 7/0456* (2013.01); *H04B 7/0617* (2013.01); *H04B 7/0626* (2013.01)

(58) Field of Classification Search
CPC .... H04B 7/024; H04B 7/0456; H04B 7/0617; H04B 7/0626
See application file for complete search history.

(56) References Cited

U.S. PATENT DOCUMENTS

| | | | | |
|---|---|---|---|---|
| 2012/0281556 | A1* | 11/2012 | Sayana | H04B 7/024 370/252 |
| 2014/0044061 | A1* | 2/2014 | Yue | H04W 72/042 370/329 |
| 2016/0020843 | A1* | 1/2016 | Li | H04L 5/0085 375/267 |
| 2017/0149493 | A1* | 5/2017 | Arapoglou | H04B 7/0452 |

* cited by examiner

*Primary Examiner* — David B Lugo
(74) *Attorney, Agent, or Firm* — Browdy and Neimark, P.L.L.C.

(57) ABSTRACT

A method and system for reducing the number of control-bits for enabling joint processing between smart remote radio heads (S-RRHs) of a mobile cellular network includes an S-RRH configured to determine estimates of a communications channel established with end users of the S-RRH, to divide the communications channel into strong end user channels and weak end user channels, to determine a first pre-coding matrix as a projection matrix of a subspace spanned by the strong end user channels into a null space of the weak end user channels, to apply the first pre-coding matrix to a front-end of the S-RRH to create a lower dimension effective channel to the end users, to quantize the channel state information (CSI) of the lower dimension effective channel, and to deliver the quantized, lower dimension CSI to a shared computing unit.

5 Claims, 7 Drawing Sheets

HIERARCHIC BEAM-FORMING IN A CLOUD RADIO ACCESS NETWORK

RELATED APPLICATIONS

The present invention claims priority from U.S. provisional patent application 62/559894 filed on Sep. 18, 2017 and incorporated herein by reference.

FIELD OF THE INVENTION

The present invention relates to mobile cellular networks.

BACKGROUND OF THE INVENTION

The demand for high data rates in mobile communications and the rapid increase in the number of cellular consumers has led to an aggressive reuse of frequencies, which increases the co-channel interference between adjacent cells. Such interference degrades system throughput, particularly to cell edge users. Coordinated multi-point (CoMP) transmission, in which adjacent smart-remote radio heads (S-RRH), or base stations (BSs), coordinate their transmission and jointly form a cluster which serves several mobile stations, is a known method for mitigating co-channel interference. One scheme of CoMP, employing joint processing (JP), is based on transforming the interference into a useful signal. JP however requires a large transmission overhead for sharing channel state information (CSI) between the S-RRHs that form the cluster.

Fifth generation (5G) mobile communication standards include architectural modifications that facilitate inter-cell cooperation. For example, in the cloud radio access network (C-RAN) architecture, a centralized base band unit (BBU) is connected via high data-rate links, dubbed the front-haul, to a large number of remote radio heads (RRHs). RRHs typically have some local processing capability and are called smart RRHs (S-RRHs). The BBU typically includes multiple base transceiver stations and therefore may also be referred to as a BBU pool.

Although an architecture of S-RRHs communicating to the BBU allows for some inter-cell cooperation, it does not support the level of cooperation required for JP. This is because in JP, the CSI must be quantized, fed back to the BBU, and processed in order to calculate a joint pre-coding matrix, which must then be quantized and fed back to the corresponding S-RRH. When all communications is through the BBU, the process generally cannot be done within a few milliseconds, which means that the CSI becomes outdated.

SUMMARY OF INVENTION

Embodiments of the present invention provide a method and system of Coordinated multi-point (CoMP) transmission referred to hereinbelow as hierarchical beam-forming, or alternatively, as "pre-coding and quantization" (P&Q). The method and system reduce the feedback overhead of sharing CSI between S-RRHs. First, each S-RRH calculates a local pre-coding matrix such that the channels toward a certain set of users that the S-RRH serves are force to be null. As a result, the channels to the remaining users are of a lower dimensional (LD) signal space. During the second stage, a computation unit, or a centralized base band unit (BBU), calculates a joint pre-coding matrix, according to the global quantized CSI.

DETAILED DESCRIPTION OF THE INVENTION

Figure 1:
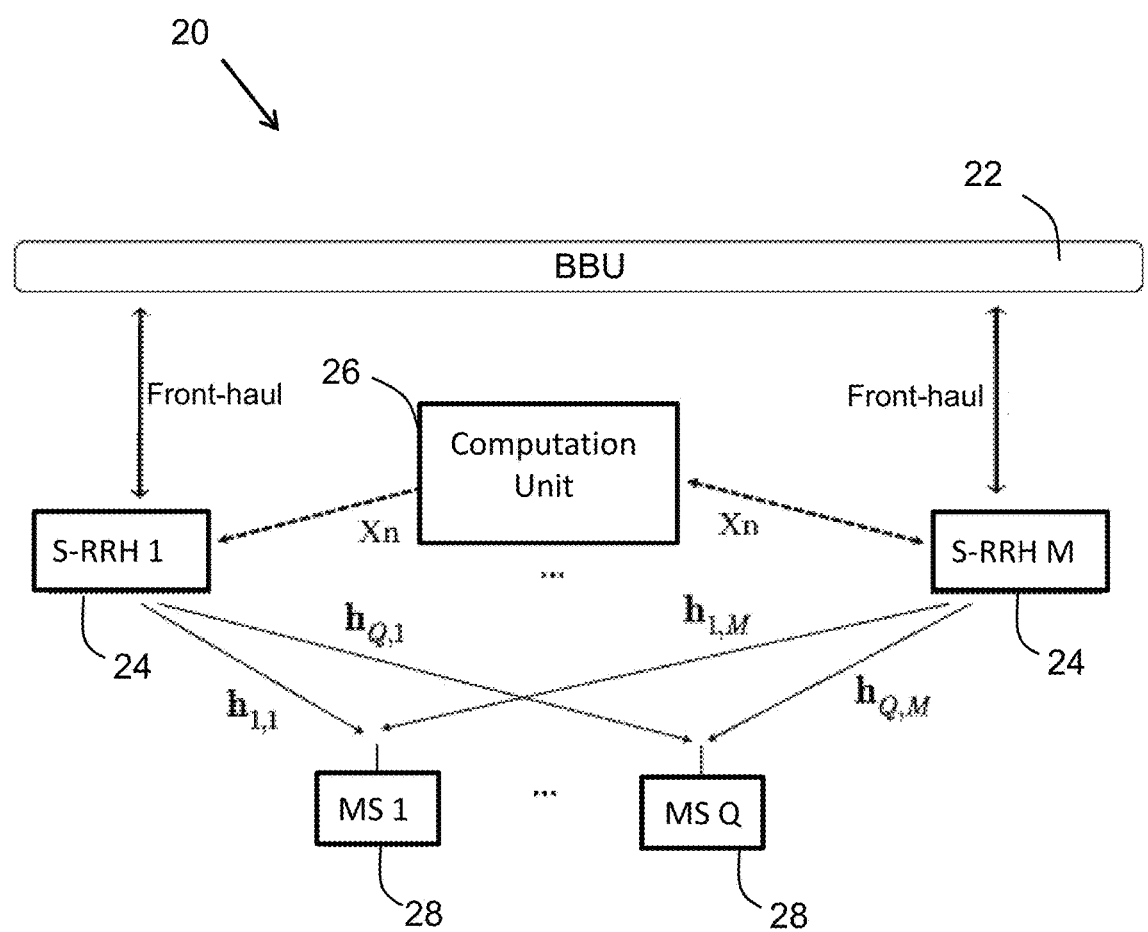
FIG. 1 is a schematic diagram of a system for low latency computing of joint beam-forming parameters for multiple radio heads of a mobile cellular network, according to an embodiment of the present invention.

FIG. 1 is a schematic diagram of a system 20 for low latency computing of joint beam-forming parameters for multiple radio heads of a mobile cellular network, according to an embodiment of the present invention. A centralized base band unit (BBU) 22 is connected via front-haul links to multiple S-RRHs 24, indicated as S-RRH-1 through S-RRH-M, in an RRH cluster. The S-RRHs send their local CSI to a front-end CoMP computation unit (CU) 26 to implement joint processing (JP) transmission. The S-RRHs support multiple mobile stations 28, indicated as MS-1 through MS-Q (also referred to herein as "end users", "user equipment" or simply "users").

The computation unit is interconnected to the cooperating S-RRHs via a low latency link, such as an Xn-link suggested in the 5G standard. Such a link is rate limited. The present invention provides a CSI feedback scheme whereby each S-RRH in the cluster calculates a local pre-coding matrix according to its local CSI. Each S-RRH multiplies its transmitted signals by its local pre-coding matrix, and as a result restricts the channels between it and the mobile stations to a lower dimensional signal space. Because lower dimensional channels can be quantized more accurately for a given number of bits, the quantization introduces less error, so throughput loss as a result of CSI quantization error is reduced.

To reduce channel dimensions, each S-RRH is set to serve only some of the end users (i.e., mobile stations), and employs a pre-coder that projects the channel of these served end users into the null space of the channel to the users which are not served (i.e., "not intended") by that S-RRH. This reduces the dimensions of the channel between each S-RRH and its intended (served) end users. The reduced number of dimensions of the pre-coded matrix means that the quantization process does not need to reduce bits, so there is less quantization error.

Each S-RRH may be configured, for example, to determine the set of unintended end users as those with the lowest link budget; i.e., the mobile stations that receive the lowest power from that S-RRH, or the weakest signal. Alternatively, other metrics may be used to determine the end users who are not served (such as distance, which means each S-RRH induces a null in the directions of the end users that are farthest from it).

Among the non-served mobile stations, if the link budget is below some threshold, the S-RRH treats these channels as if they were zero. For other non-served mobile stations, the S-RRH employs zero forcing (ZF); i.e., it projects the channels of its intended users into the null space of non-served mobile stations with link budget above the threshold as described below in the section on Signal Calculation. The resulting effective channels to the intended mobile stations are then quantized and fed to the CoMP computation unit, which calculates a joint beam-former based on the CSI received from all S-RRH. The joint beam-former is then sent back to each S-RRH with each S-RRH's corresponding part of that beam-former (i.e., a second pre-coding matrix).

Because of the local pre-coding, which is followed by the high-level beam-forming design at the front-end CoMP computation unit, the scheme may be called hierarchical beam-forming. Hereinbelow, the scheme is also referred to as "pre-coding and quantization" (P&Q).

The gain from this local pre-coding is twofold. First, the dimension is reduced, such that the "new" effective channels can be conveyed more accurately to the BBU, for a given number of quantization bits, and also the computational complexity at the BBU is reduced. The second advantage is that after the local pre-coding, each S-RRH serves fewer end users and, as a result, needs to deliver through the front-haul only the CSI of these end users, a savings of:

(number of end users in the set)/(total of end users in channel of S-RHH)*100%

This is the percent of end users relative to the full CSI each S-RRH needs to deliver to the BBU. This savings allows more bits for the CSI of the remaining channels, such that the CSI at the BBU will be more accurate. In addition, no information signals of the users that were cut off need to be delivered to the S-RRHs, which also reduces the load on the front-haul. The nulling operation is done by zero forcing beam-forming with perfect CSI (we assume a system with TDD), as described further below. This ensures that the channels toward the remaining end users are perfectly projected into the null space of the channels toward the end users in the set. When the CSI at the S-RRHs is exact, according to a protocol of Time Division Demultiplexing (TDD), these channels are projected into their own null spaces and hence canceled and do not interfere with the useful signals.

This scheme permits using more bits for the CSI of the remaining channels, such that the CSI at the computation unit will be more accurate. In addition, no information signals of the users that were cut off need to be delivered toward the SRRHs, which further reduces the load on the front-haul.

Figure 2:
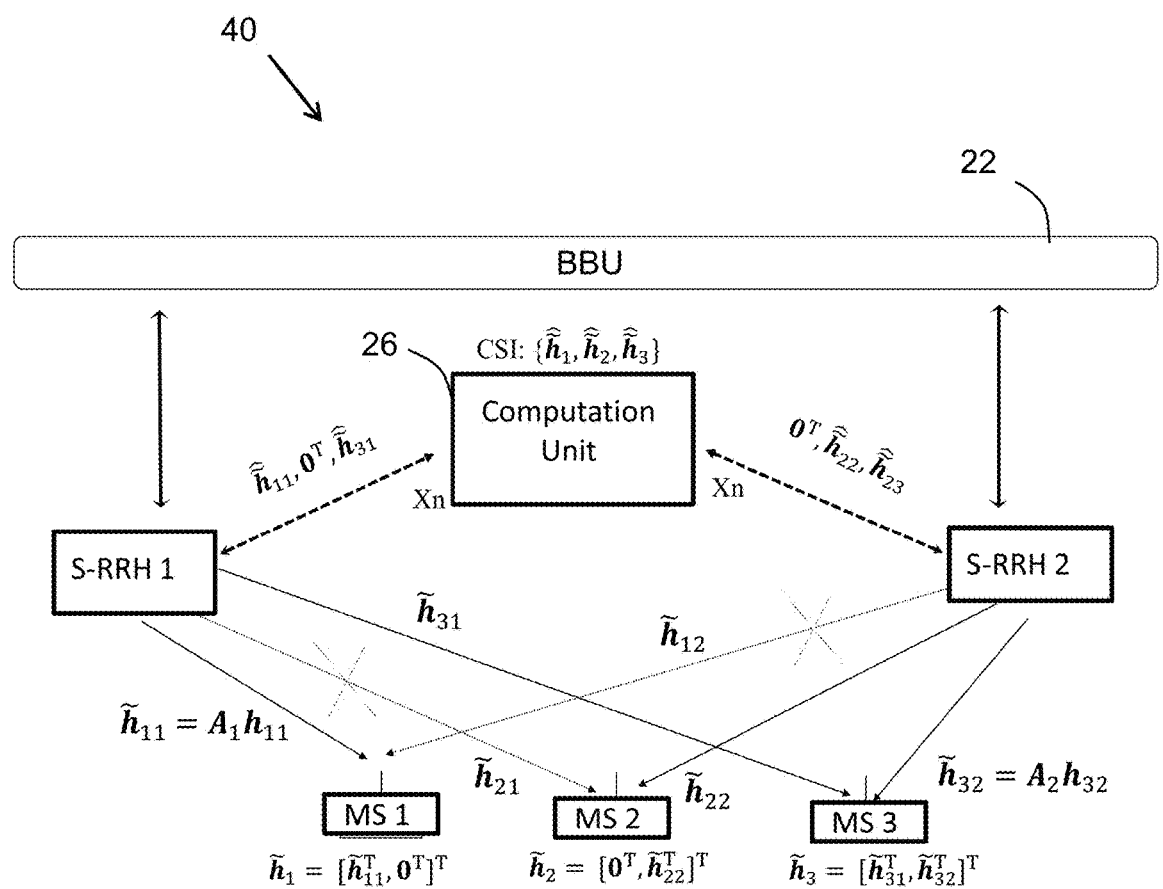
FIG. 2 is a schematic diagram of the system, showing a local pre-coding quantization of channels by each S-RRH, reducing the number of channel dimensions of each S-RRH, with three users, two S-RRHs, and dimension reduction of 1, according to an embodiment of the present invention.

FIG. 2 shows an example of the proposed scheme with three end users (MS1, MS2, and MS3), two S-RRHs (S-RRH 1 and S-RRH 2) and a dimension reduction of one. A detailed mathematical formulation of the scheme is given in the Signal Calculation Section below. As indicated in the figure, the channel between the S-RRH 1 and MS2 is cancelled, as is the channel the channel between S-RRH 2 and MS1. Channel notations, described in more detail below, are also shown in the figure.

FIGS. 3-6 are simulation results, showing that the hierarchical beam-forming scheme of the present invention outperforms other schemes, in terms of average throughput. For the simulation, the parameters were: M=4 S-RRHs, N=8 transmit antennas each, and $Q=7$ single antenna end users. Every end user in the system is assumed to receive signals from all the S-RRHs. A threshold distance of the S-RRH in the cluster means an end user is not served, because the co-channel interference from that S-RRH is relatively weak.

Every S-RRH calculates its local pre-coder with dimension reduction such that every S-RRH forces null towards four end users. The Lloyd-Max algorithm was applied for quantizing the CSI, with B=3 quantization bits for each channel entry, and random vector quantization (RVQ) with B=22 bits per channel vector. The pre-coders calculated at the computation unit were based on zero forcing (ZF) beam-forming. In addition, to enhance performance, pre-coders were based on maximal ratio combining. After the calculation at the computation unit another round of quantization is performed.

(In the simulation, each S-RRH is assumed to transmit the same power, P, divided equally among its end users. The power from all the beam-forming vectors that each S-RRH transmits is limited so as to not to exceed the value of P.)

Figure 3:
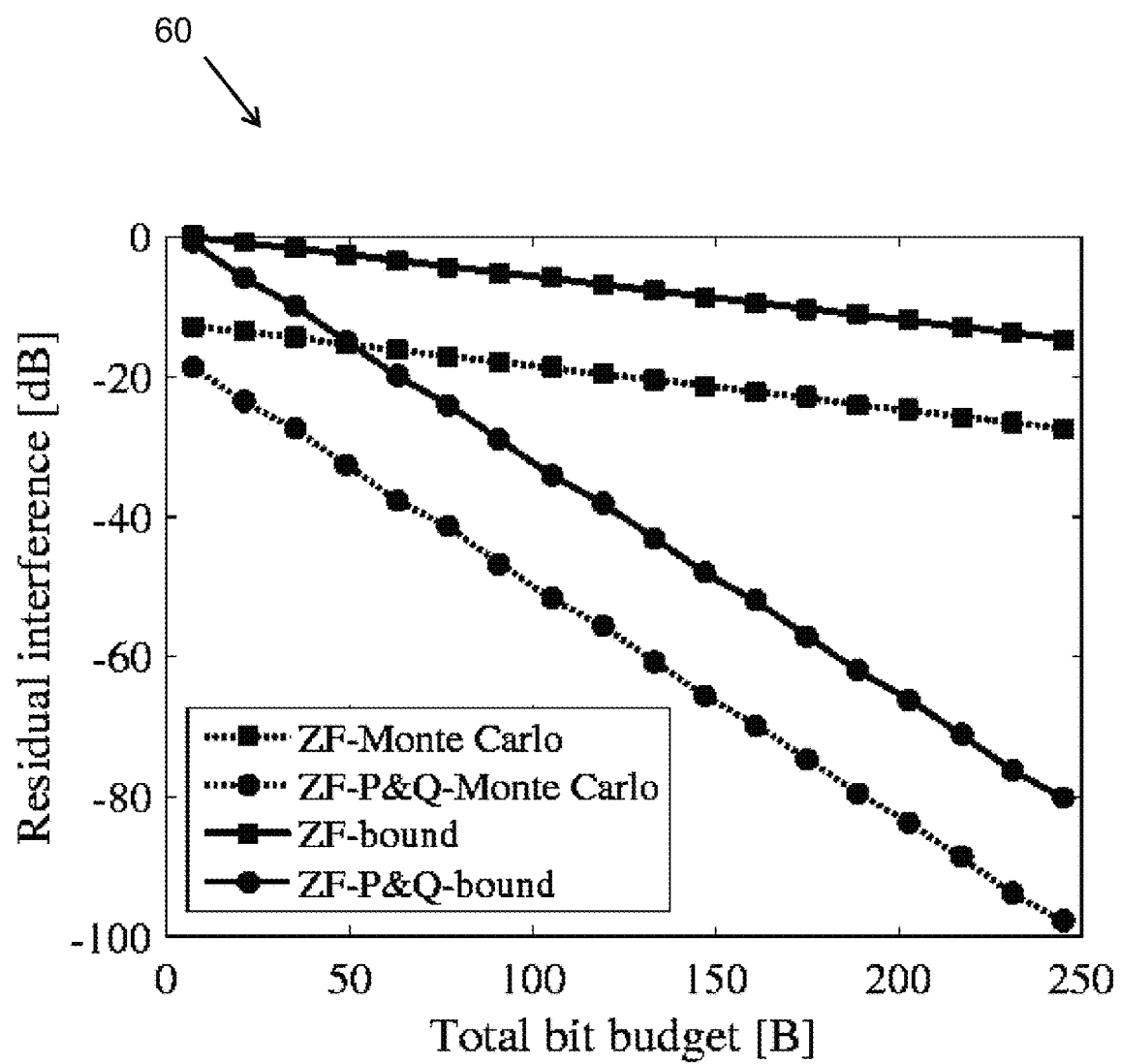
FIG. 3 is a graph of the upper bounds on the expected residual interference, with and without P&Q, as a function of the overall bit budget.

In FIG. 3, graph 60 shows the upper bounds on the expected residual interference, with and without P&Q, as a function of the overall bit budget.

Figure 4:
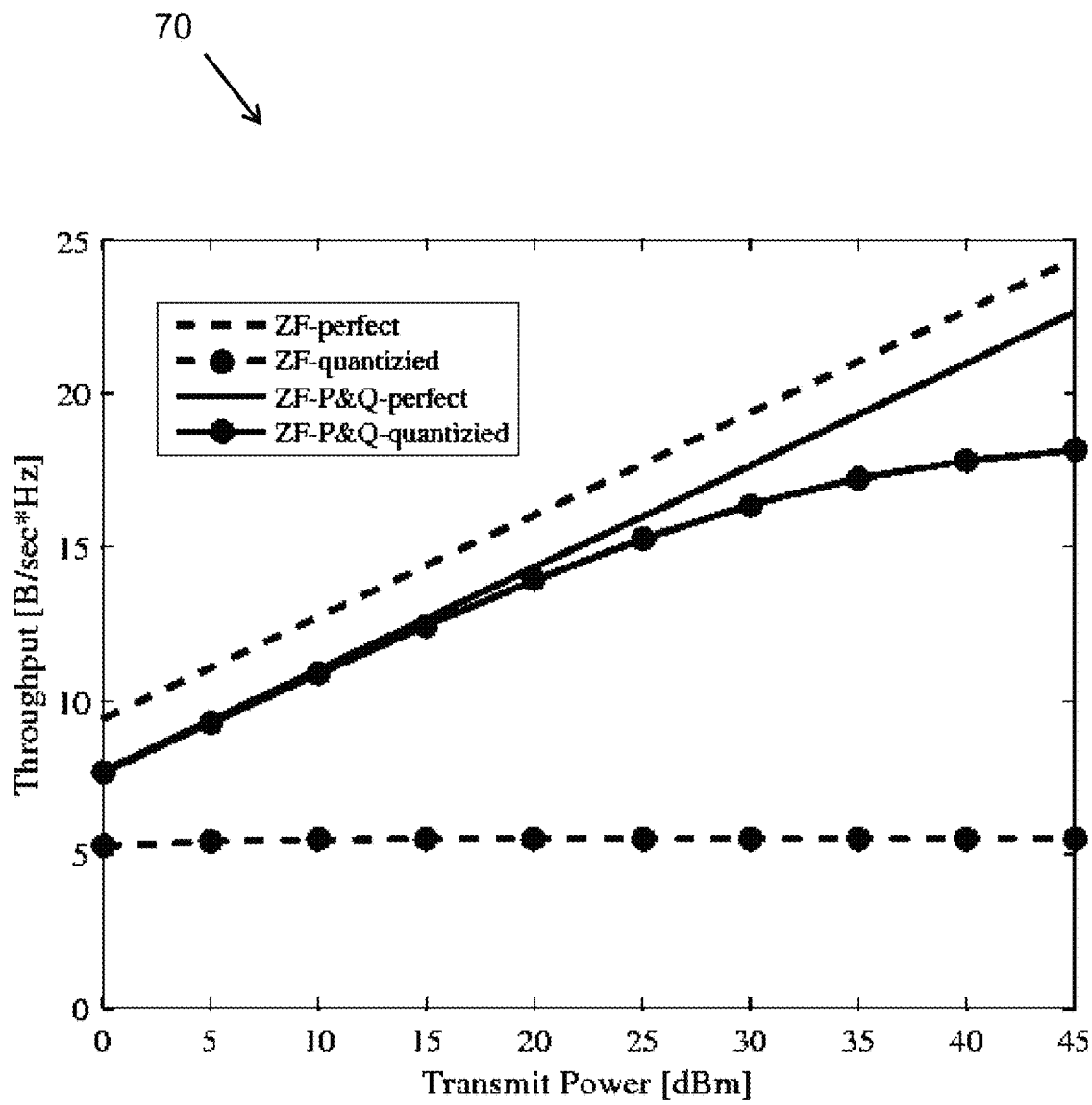
FIGS. 4 and 5, are graphs of the average throughput of the system, as a function of transmit power and bit budget, respectively.
Figure 5:
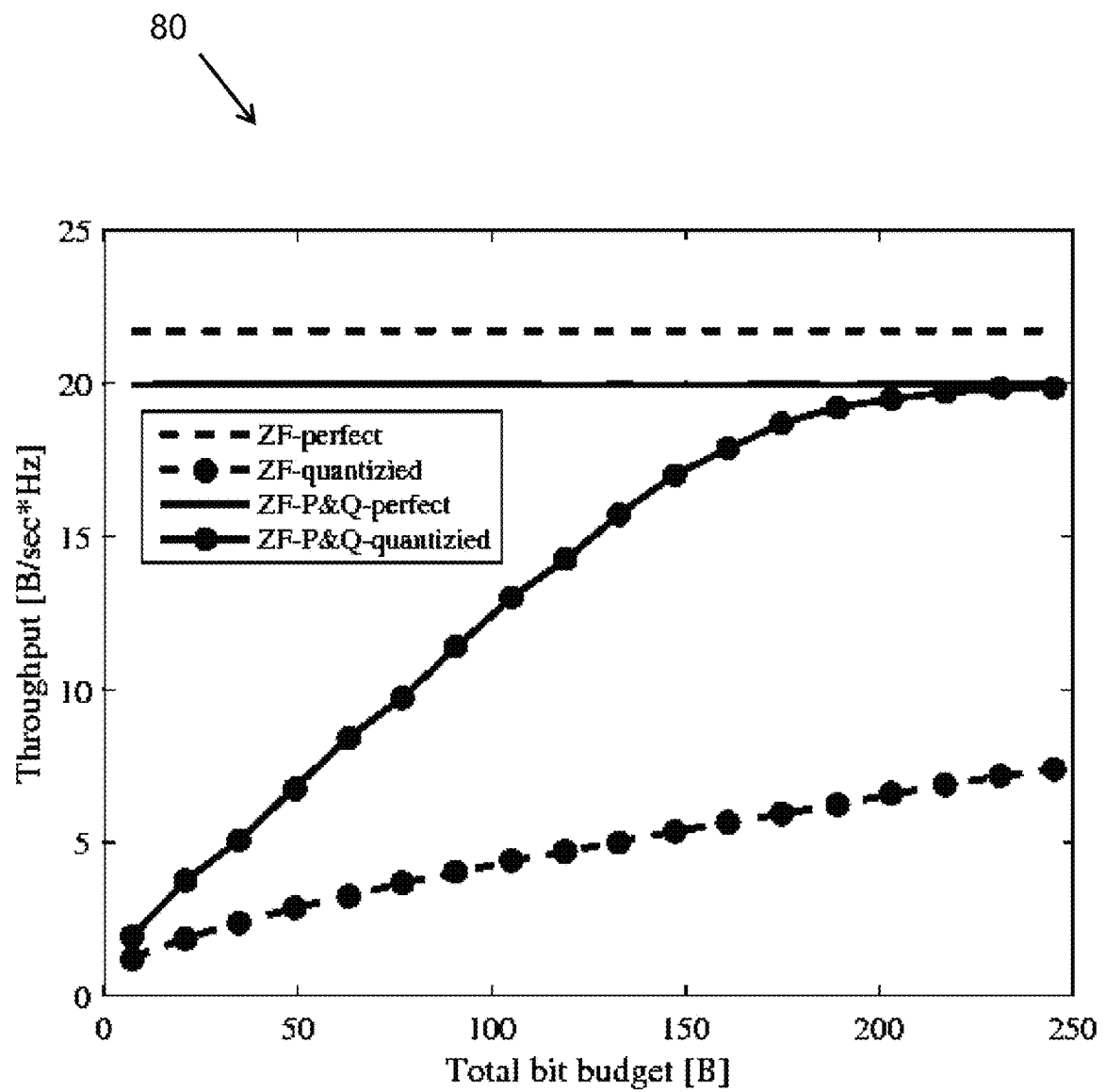

In FIGS. 4 and 5, respective graphs 70 and 80 show the average throughput of the system, as a function of transmit power and bit budget, respectively. Theoretical ("perfect") throughput is compared with calculated throughput, with and without P&Q.

Figure 6:
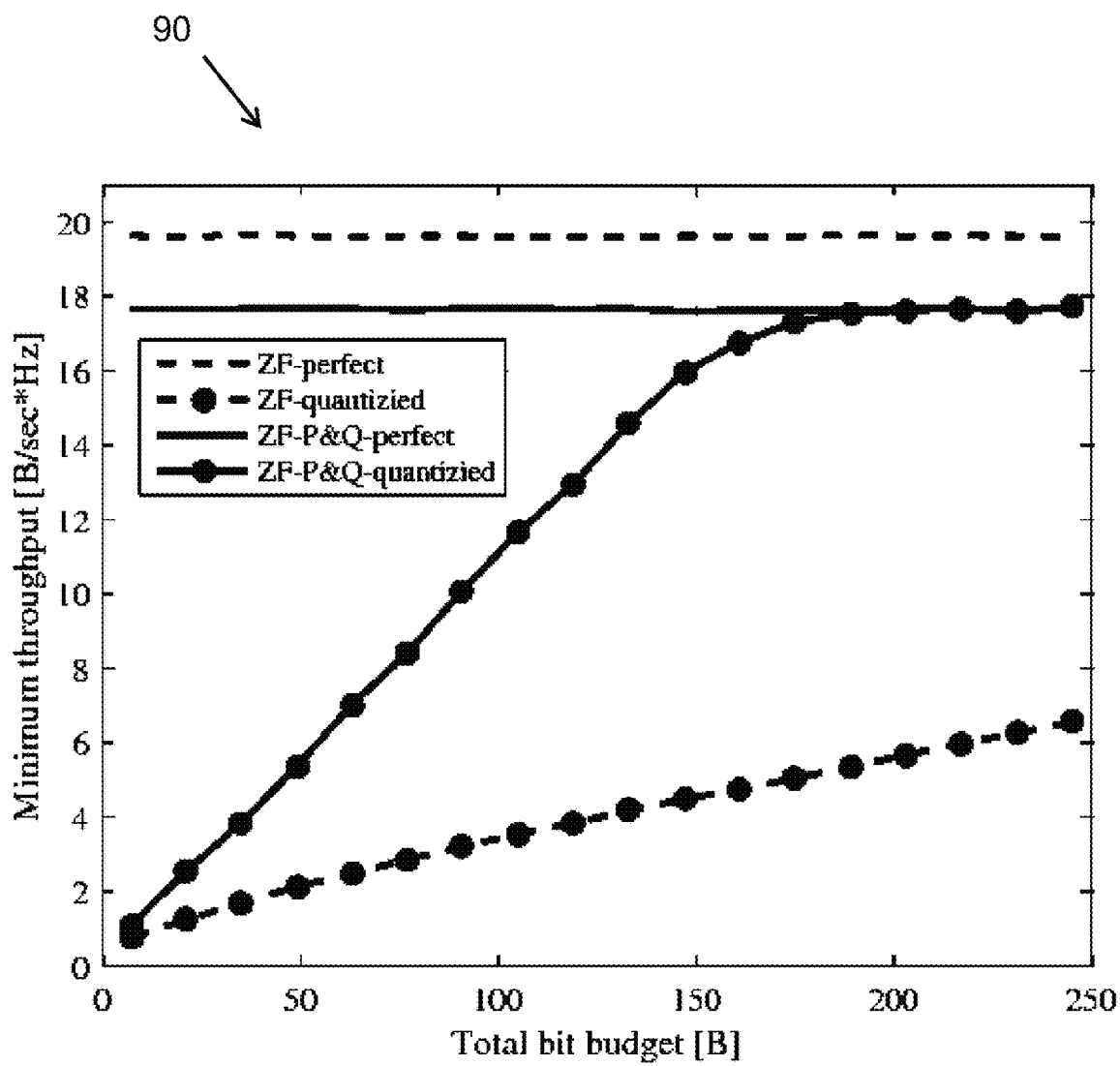
FIG. 6 is a graph of minimum throughput of the system, as a function of transmit power at each S-RRH.

FIG. 6, graph 90 shows minimum throughput as a function of transmit power at each S-RRH, with the P&Q scheme and without.

The simulation results show the advantage of hierarchical beam-forming due to the lower dimensional channels, which, for a given number of bits, have lower quantization errors, and as a result, lead to the computation of more accurate beam-formers. The scheme overcomes the problems of inaccurate CSI and limited front haul capacity, which limit throughput when employing CoMP.

Figure 7:
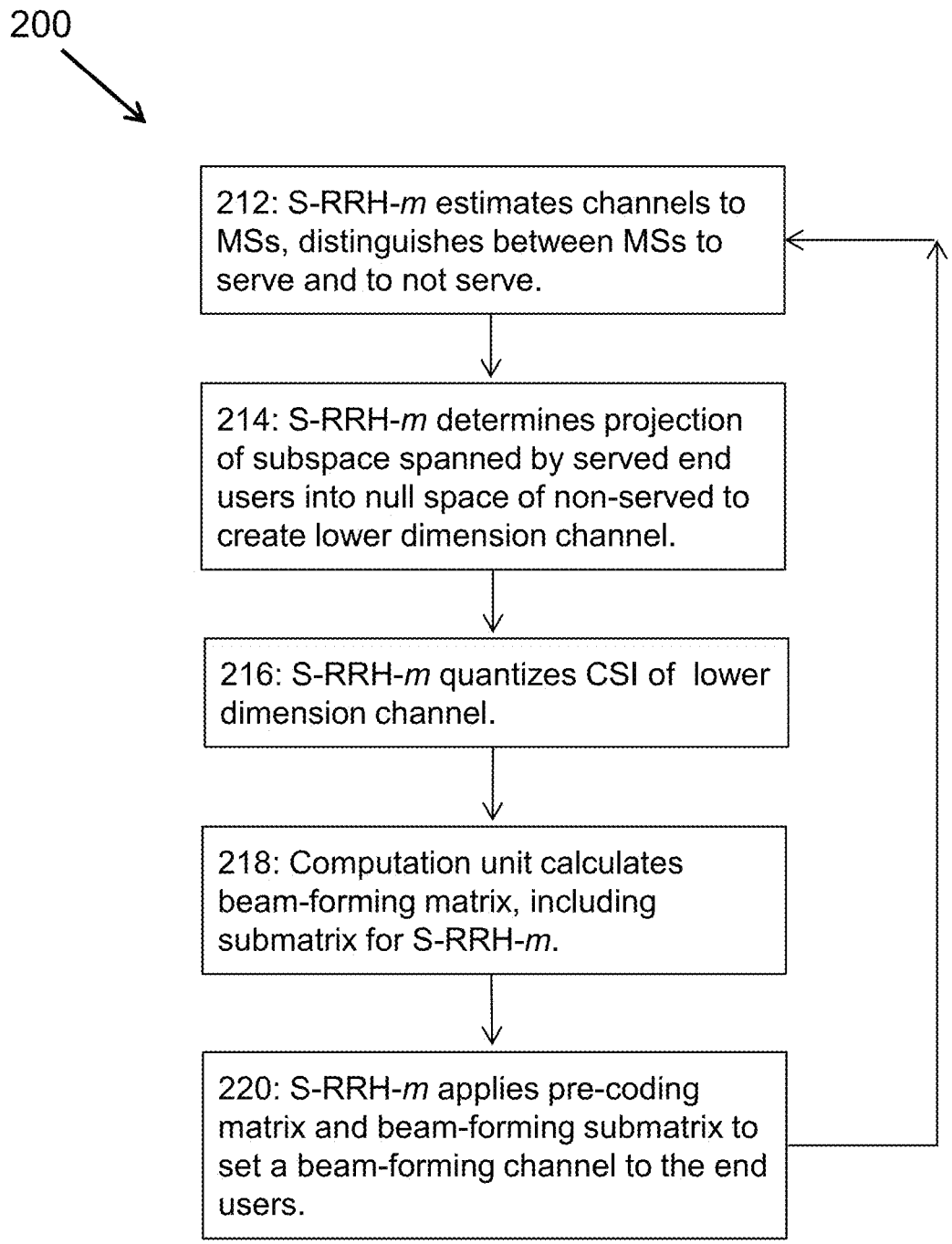
FIG. 7 is a schematic flowchart of the system operation, according to an embodiment of the present invention.

FIG. 7 is a schematic flowchart 200 summarizing the system operation described above, according to an embodiment of the present invention. As described above, multiple S-RRHs are configured to send their local CSI to a front-end CoMP computation unit (CU) to implement joint processing (JP). The flowchart indicates the processing that S-RRHs are configured to perform, as well as the processing of the CU. The processing shown is an iterative process.

At a step 212, a given S-RRH, indicated as S-RRH-m, estimates a communications channel established with end users of the S-RRH and distinguishes between a first group of end users that will be cancelled from the CSI and a second group that will be served. (End users with very low signals may simply be ignored.) As described above, the two groups may be distinguished based on various criteria, such as distance and/or signal power. Communications between the S-RRH and the end users is typically performed by Time Division Demultiplexing (TDD).

At a subsequent step 214, the S-RRH determines a pre-coding matrix as a projection matrix of a subspace spanned by the served end user channels into a null space of the non-served end user channels. The S-RRH then applies this pre-coding matrix to the S-RRH front-end to create a lower dimension effective channel to the end users.

At a step 216, the S-RRH quantizes channel state information (CSI) of the lower dimension effective channel and delivers the quantized, lower dimension CSI to the computing unit.

At a step 218, the computation unit calculates, from the quantized, lower dimension CSI together with additional CSI of one or more additional S-RRHs, a joint beam-forming matrix, including a sub-matrix for the S-RRH (also referred to herein as a "second pre-coding matrix"), and the computation unit sends the joint beam-forming matrix to the S-RRH.

At a step 220, the S-RRH then applies the first and second pre-coding matrices to the front-end of the S-RRH, in order to set a beam-forming channel between the S-RRH and the end users.

Details of the processing performed by the S-RRHs and computation unit are provided in the following section describing the signal calculations.

Signal Calculations

Background: For a group of S-RRHs (defined as a set $\mathcal{M}$) connected to a computation unit via limited rate links (i.e., front-hauls) and serving Q single-antenna end users (i.e., mobile stations, defined as a set $\mathcal{Q}$), the downlink signal observed by a given MS-q is given by:

$$y_q = \Sigma_m \tilde{h}_{q,m}^\dagger x_j + n_q$$

where, $\forall q \in \mathcal{Q} \triangleq \{1, \ldots, Q\}$ $n_q$ is white Gaussian noise, $n_q \sim CN(0,1)$, $x_m \in \mathbb{C}^{N_t \times 1}$ is the signal transmitted by S-RRH-m, $N_t$ is the number of antennas, $h_{q,m} \in \mathbb{C}^{N_t \times 1}$ is the channel between S-RRH-m and MS-q.

The channel transmitted from S-RRH-m to the set of Q MSs is:

$$H_m^t = [h_{1,m}, \ldots, h_{Q,m}] \in \mathbb{C}^{N_t \times Q}$$

As described above (the step 212 of FIG. 7), S-RRH-m estimates this channel $H_m^t$ and then selects the subsets of channels to serve and to not serve.

The channel received by a given MS-q from all S-RRHs is:

$$h_m^r = [h_{q,1}^T, \ldots, h_{q,M}^T] \in \mathbb{C}^{N_t M}$$

The total signal is the signal transmitted by all S-RRHs:

$$x = [x_1^T, \ldots, x_M^T]$$

The set of all S-RRHs is denoted as:

$$\mathcal{M} = \{1, \ldots, M\}$$

The terms $h_{q,m} \in Q \times M$ are independently drawn from an identical complex Gaussian distribution. The channels are assumed to be flat, Rayleigh, independent identical distributed (i.i.d.), block fading with path loss $\alpha_{q,m}$; i.e., $$h_{q,m} = \alpha_{q,m} \mathring{h}_{q,m}, \forall q \in \mathcal{Q}, m \in M,$$

where $\alpha_{q,m}$ is deterministic, and $\mathring{h}_{q,m} \sim CN(0, I_{N_t})$, i.e., a complex normal function. $I_{N_t}$ is an $N_t \times N_t$ identity matrix. We assume a practically oriented linear pre-coding scheme in which the overall transmit signal is:

$$x = \Sigma_{q \in \mathcal{Q}} s_q \tilde{p}_q^r$$

where $s_q$ is the information-bearing signal intended for MS-q and $\tilde{p}_q^t$ is the corresponding pre-coding vector, which can be determined as:

$$\tilde{p}_q^t = [\tilde{p}_{q,1}^T \ldots \tilde{p}_{q,M}^T]^T$$

where $\tilde{p}_{q,M} \in \mathbb{C}^{N_t}$ is the beam-forming vector used by S-RRH-m to pre-code the information-bearing signal $s_q$.

The overall joint beam-former vector designated for MS-q is $$y = H^\dagger x + n, \text{ where } y \in \mathbb{C}^Q, n \in \mathbb{C}^Q \text{ and } H \in \mathbb{C}^{N_t M \times Q}$$

Assuming time division duplex (TDD), every S-RRH estimates the channels between it and the MSs in its vicinity using channel reciprocity through the uplink. Thus, S-RRH-m has a local CSI $H_m^t$, which is sent to the computation unit, which in turn calculates an overall pre-coding matrix, which is sent back to each S-RRH, and which includes each S-RRH's corresponding sub-matrix. That is, the computation unit designs a matrix $\{P_m^t\}_{m=1}^M$ and then sends each S-RRH-m its local pre-coding matrix $P_m^r$.

In practice, the front-haul has limited capacity. Thus, the CSI at the computation unit is $U_{CU} = \{\hat{H}_m^t\}_{m=1}^M$, where $\hat{H}_m^t$ is the quantized version of $H_m^t$, from which it designs the pre-coding $\{P_m^t\}_{m=1}^M$ and feeds back a quantization of $P_m^t$, namely, $P_m^t$, namely, $\hat{P}_m^t$. As noted above, $\hat{P}_m^t$ is a parameter in the equation for x, the overall transmit signal.

Pre-coding matrix: In the P&Q scheme, each S-RRH, for example S-RRH-m, calculates a local pre-coding matrix $A_m$ according to its local CSI $\{h_{q,m}\}, q \in \mathcal{Q}$. By applying $A_m$ at its front end, S-RRH-m creates effective low-dimensional channels $\tilde{h}_{q,m}^\dagger = h_{q,m}^\dagger A_m$, $\forall q \in \mathcal{Q}$, where $\tilde{h}_{q,m} \in \mathbb{C}^{d \times 1}$, and $A_m \in \mathbb{C}^{N_t \times d}$, where the new dimension d satisfies $d < N_t$. Because $\tilde{h}_{q,m}$ has a lower dimension than $h_{q,m}$ it can be quantized more accurately.

The matrix $A_m$ may be determined as follows: S-RRH-m may designate a group to be cancelled, $\bar{S}_m$, of $\bar{Q}$ MSs with the weakest signals (or, for example, based on a criteria of "path loss"), where $\bar{S}_m$ is a subset of $\mathcal{Q}$. That is, $\alpha_{q,m} \leq \alpha_{q',m}$, $\forall q \in \bar{S}_m, q' \in \mathcal{Q} \setminus \bar{S}_m$. The S-RRH-m then sets $d = N_t - \bar{Q}$. Then $A_m$ is the projection matrix into the null space of the matrix whose columns are given by $\{h_{q,m}\}_q \in \bar{S}_m$; i.e., $$A_m = [u_1 \ldots u_d]$$

where $u_1 \ldots u_d \in \mathbb{C}^{N_t \times 1}$ is an orthonormal basis for the orthogonal complement of span($\{h_{q,m}\} q \in \bar{S}_m$). This means that each S-RRH-m serves only $Q - \bar{Q}$ MSs denoted by $S_m = Q \setminus \bar{S}_m \subset Q$. Assuming each S-RRH has perfect local CSI, the resulting effective channels to MS-q, $q \in \bar{S}_m$ are zero. As a result, the number of channels that must be quantized and fed back to the CU is reduced from Q to $\bar{Q}$ and, more importantly, their dimension is reduced from $N_t$ to d. Consequently, the resulting effective channels $\{\tilde{h}_{q,m}\}_q \in S_m, m \in M$, can be quantized more accurately with a given number of bits. The quantization of $\{\tilde{h}_{q,m}\}_q \in S_m$ is denoted as $\{\hat{\tilde{h}}_q\} \in S_m$, and $\hat{\tilde{h}}_q$ is defined as:

$$\hat{\tilde{h}}_q \triangleq [\hat{\tilde{h}}_{q,1}^\dagger, \ldots \hat{\tilde{h}}_{q,M}^\dagger] \in \mathbb{C}^{Md \times 1}$$

(Note that, for S-RRH-m, $\{\tilde{h}_{q,m}\}_q \in Sm = \{\hat{\tilde{h}}_{q,m}\}_q \in Sm = 0$).

Upon receiving the CSI from all S-RRHs, $U = \{\hat{\tilde{h}}_{q,m}\} q \in Q$, the CU computes a joint pre-coding matrix $\{\tilde{p}_q\} q \in Q$, where $$\tilde{p}_q = [\tilde{p}_{q,1}^{554}, \ldots, \tilde{p}_{q,M}^\dagger]^\dagger \in \mathbb{C}^{Md \times 1}$$

is the overall beam-former designated for MS-q. Then, it feeds back each S-RRH with its corresponding part of that pre-coder. S-RRH-m in turn sets its overall beam-forming vector toward MS-q as $p_{q,m} = A_m \tilde{p}_{q,m} \in \mathbb{C}^{N_t \times 1}$.

The overall beam-forming vector for MS-q is given by $$p_q \triangleq A \tilde{p}_q = A N_q \frac{\left(\hat{\tilde{h}}_q^\dagger N_q\right)^\dagger}{\left\|\hat{\tilde{h}}_q^\dagger N_q\right\|}, \forall q \in \mathcal{Q}$$

where $p_q \in \mathbb{C}^{MN_t \times 1}$, $N_q \in \mathbb{C}^{Md \times Md - (Q-1)}$ is the projection matrix into the null space of $\{\hat{\tilde{h}}_j\}_j \in Q \setminus \{q\}$, and A is a block diagonal matrix, such that $$A = \text{diag} \{A1, A2, \ldots, AM\} \in \mathbb{C}^{MN_t \times Md}.$$

Employing the P&Q scheme, the signal observed by MS-q is given by $$y_q = \tilde{h}_q^\dagger \tilde{p}_q s_q + \Sigma \tilde{h}_q^\dagger \tilde{p}_j s_j + n_q$$

where $j \in \mathcal{Q} \setminus \{q\}$, $\forall q \in \mathcal{Q}$, $\tilde{h}_q \in \mathbb{C}^{Md \times 1}$, $\tilde{p}_q \in \mathbb{C}^{Md \times 1}$.

The advantage of the scheme is twofold. First, a smaller CSI quantization error is induced. The lower dimensional channels are the dominant part in reducing that error, because the error is bounded above by $2^{-b/(d-1)}$, rather than $2^{-b/(Nt-1)}$ as it is in the base scheme, where b is the number of quantization bits allocated to a single channel. Furthermore, after the local pre-coding, each S-RRH serves less MSs, and therefore delivers fewer channels to the CU, through the limited rate links. If we assume an overall budget of B bits for each S-RRH, then the number of bits allocated to every single channel can be $B/(Q-\bar{Q})$ rather than $B/Q$. As a result, the CSI quantization error can decrease even further.

The invention claimed is:

1. A method for reducing the number of control-bits for enabling joint processing between smart remote radio heads (S-RRHs) of a mobile cellular network comprising:
   determining estimates of a communications channel established by a smart remote radio head (S-RRH) with end users of the S-RRH;
   dividing the communications channel into served end user channels and non-served end user channels;
   determining a first pre-coding matrix as a projection matrix of a subspace spanned by the served end user channels into a null space of the non-served end user channels;
   applying the first pre-coding matrix to a front-end of the S-RRH to create a lower dimension effective channel to the end users;
   quantizing channel state information (CSI) of the lower dimension effective channel and delivering the quantized, lower dimension CSI to a computing unit;
   calculating at the computing unit, from the quantized lower dimension CSI together with additional CSI of one or more additional S-RRHs, a joint beam-forming matrix, including a second pre-coding matrix for the S-RRH;
   receiving at the S-RRH the joint beam-forming matrix;
   applying the first and second pre-coding matrices to the front-end of the S-RRH to set a beam-forming channel between the S-RRH and the end users.

2. The method of claim 1, wherein communications between the S-RRH and end users of the S-RRH is performed by Time Division Demultiplexing (TDD).

3. The method of claim 1, wherein dividing the communications channel into served end user channels and non-served end user channels includes filtering out a group of low threshold end users, wherein the filtered group is ignored in the determination of the first pre-coding matrix.

4. The method of claim 1, wherein the end users of the served end user channels have stronger channel magnitudes than the end users of the non-served end user channels.

5. A system for reducing the number of control-bits for enabling joint processing between smart remote radio heads (S-RRHs) of a mobile cellular network comprising:
   a smart remote radio head (S-RRH) configured to determine estimates of a communications channel established with end users of the S-RRH, to divide the communications channel into served end user channels and non-served end user channels, to determine a first pre-coding matrix as a projection matrix of a subspace spanned by the served end user channels into a null space of the non-served end user channels, to apply the first pre-coding matrix to a front-end of the S-RRH to create a lower dimension effective channel to the end users, to quantize channel state information (CSI) of the lower dimension effective channel, to deliver the quantized, lower dimension CSI to a computing unit, to receive a joint beam-forming matrix including a second pre-coding matrix from the computing unit, to apply the first and second pre-coding matrices to the front-end of the S-RRH to set a beam-forming channel between the S-RRH and the end users; and
   the computing unit, configured to calculate from the lower dimension CSI, together with additional CSI from one or more additional S-RRHs, the joint beam-forming matrix, including the second pre-coding matrix for the S-RRH.

* * * * *